United States Patent [19]

Krammer, deceased

[11] 4,372,441

[45] Feb. 8, 1983

[54] ACCUMULATING CONVEYOR

[75] Inventor: Robert Krammer, deceased, late of White Bear Lake, Minn., by Ruth Krammer, legal representative

[73] Assignee: Rexnord Inc., Milwaukee, Wis.

[21] Appl. No.: 244,014

[22] Filed: Mar. 16, 1981

Related U.S. Application Data

[60] Division of Ser. No. 942,660, Sep. 15, 1978, Pat. No. 4,301,914, which is a continuation-in-part of Ser. No. 831,756, Sep. 9, 1977, abandoned, which is a continuation-in-part of Ser. No. 688,255, May 20, 1976, abandoned.

[51] Int. Cl.$^3$ .............................................. B65G 13/06
[52] U.S. Cl. .................................... 198/781; 198/789
[58] Field of Search ...................... 198/781, 789–791; 74/206, 380, 384

[56] References Cited

U.S. PATENT DOCUMENTS

| | | | |
|---|---|---|---|
| 3,066,788 | 12/1962 | Christiansen | 198/781 |
| 3,643,788 | 2/1972 | Werntz | 198/781 |
| 3,718,248 | 2/1973 | Muller | 198/781 |
| 3,729,088 | 4/1973 | Vom Stein et al. | 198/781 |
| 3,939,962 | 2/1976 | Gebhardt | 198/781 |
| 4,108,303 | 8/1978 | Vogt et al. | 198/781 |
| 4,121,709 | 10/1978 | Gebhardt | 198/781 |
| 4,301,914 | 11/1981 | Krammer | 198/781 |

Primary Examiner—Joseph E. Valenza
Attorney, Agent, or Firm—Robert H. Kelly; Vance A. Smith

[57] ABSTRACT

Disclosed are powered roller, accumulating conveyors incorporating improved friction wheel drive means for transmitting driving forces to any given zone of the conveyor, independently of all other zones, from a single powered endless belt in a first embodiment and from a powered chain in second, third and fourth embodiments. In the first embodiment a pressure roller is pivoted longitudinally and downwardly to a position in which it is wedged between the lower course of a belt and a friction wheel to transmit drive forces from the former to the latter and thus to the load carrying rollers; and in the second, third and fourth embodiments a chain driven pressure roller is pivoted longitudinally and downwardly into driving engagement with a friction wheel to transmit drive forces from the pressure roller to the load carrying rollers in a zone, a plurality of load carrying rollers in each zone being drivingly interconnected by a separate chain system in the second and third embodiments, and being drivingly engaged by a V-belt in the fourth embodiment. In all four embodiments the pressure roller is mounted for pivotal movement about an axis eccentric with respect to the axis of rotation of the friction wheel it engages, and the parts are arranged so that the pressure roller engages the friction wheel at a highly oblique angle to give a wedging action capable of transmitting relatively high drive forces. There is also disclosed a modified drive means for use with endless belts which maintains constant belt length regardless of the number of conveyor zones being powered at one time.

4 Claims, 19 Drawing Figures

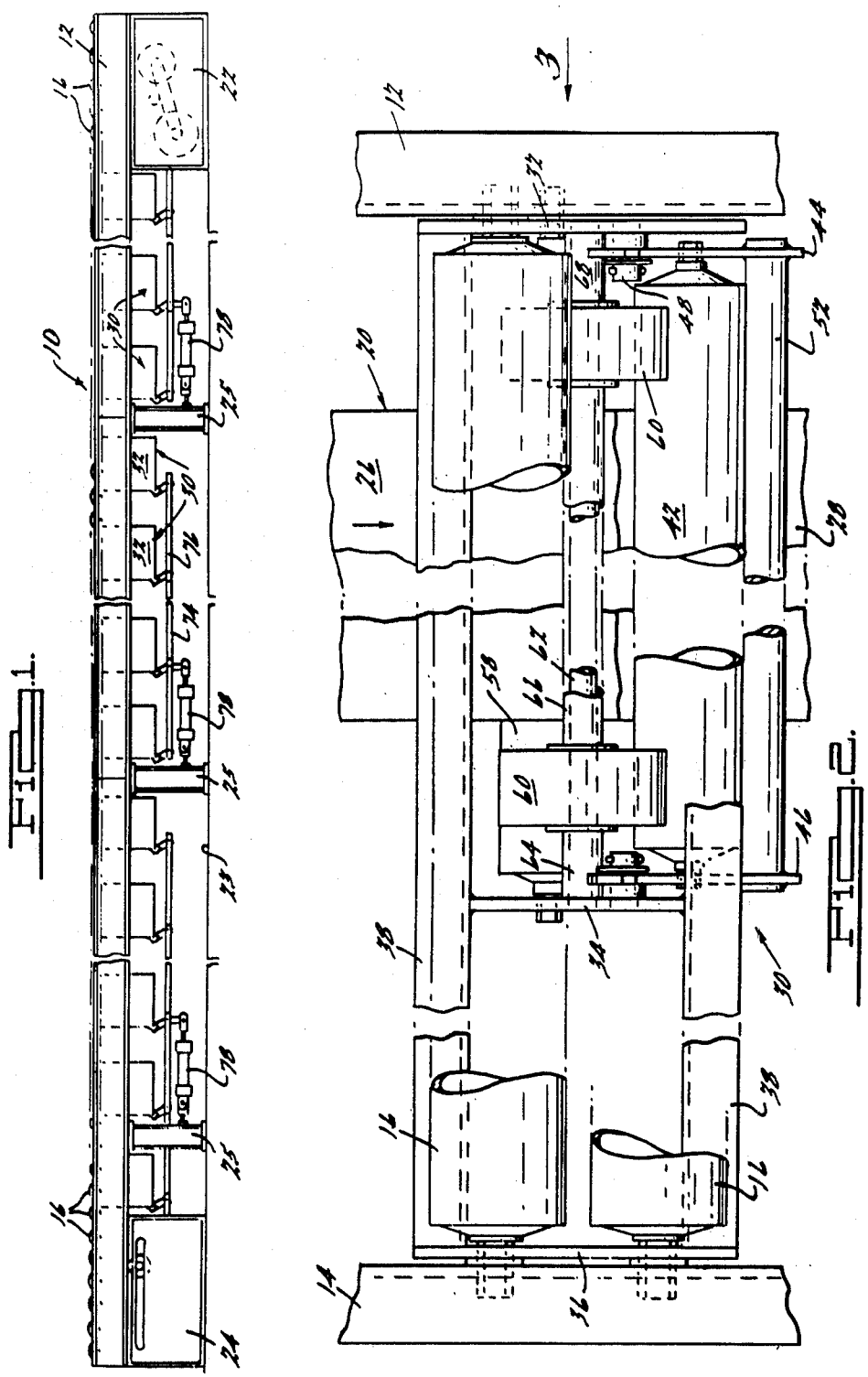

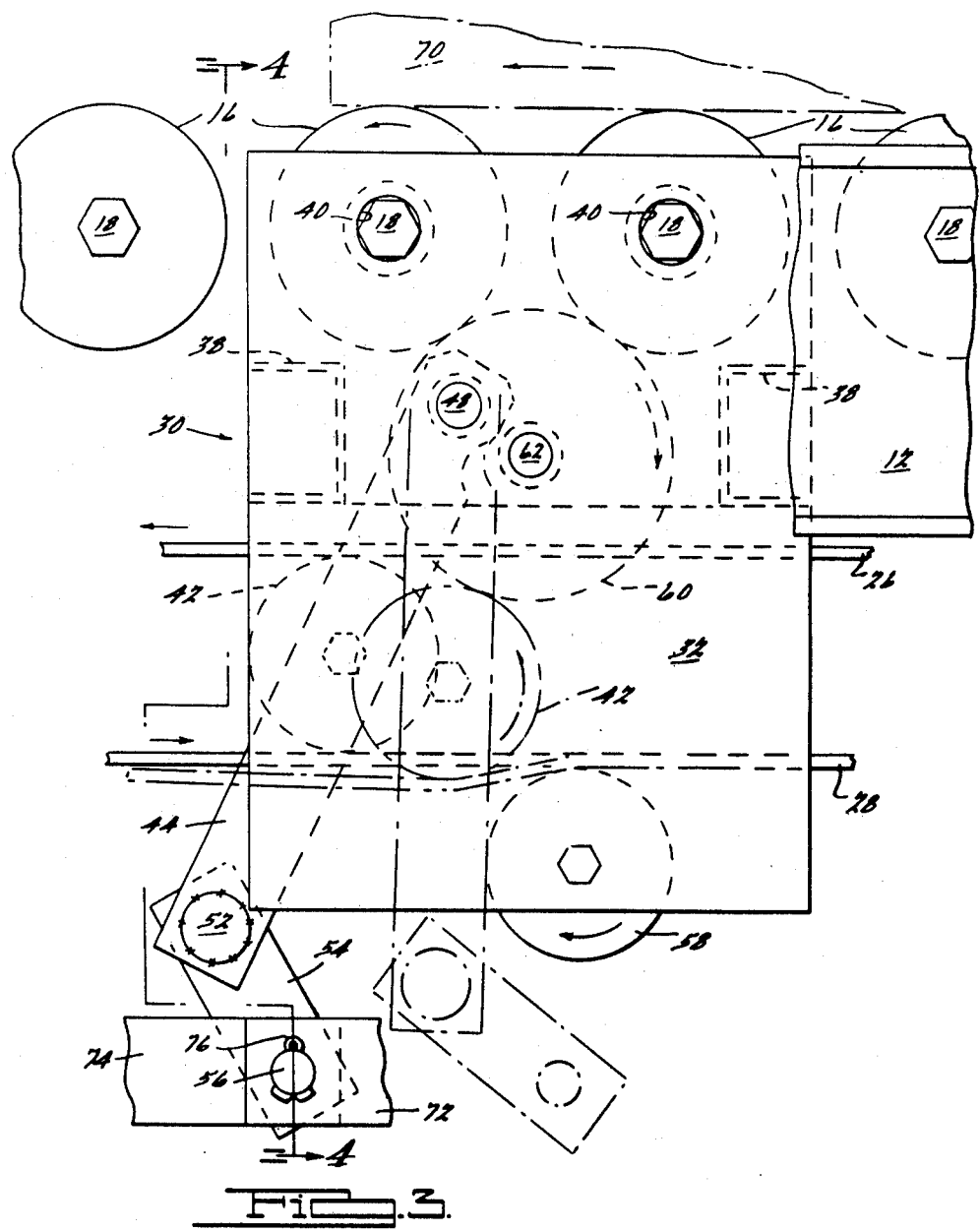

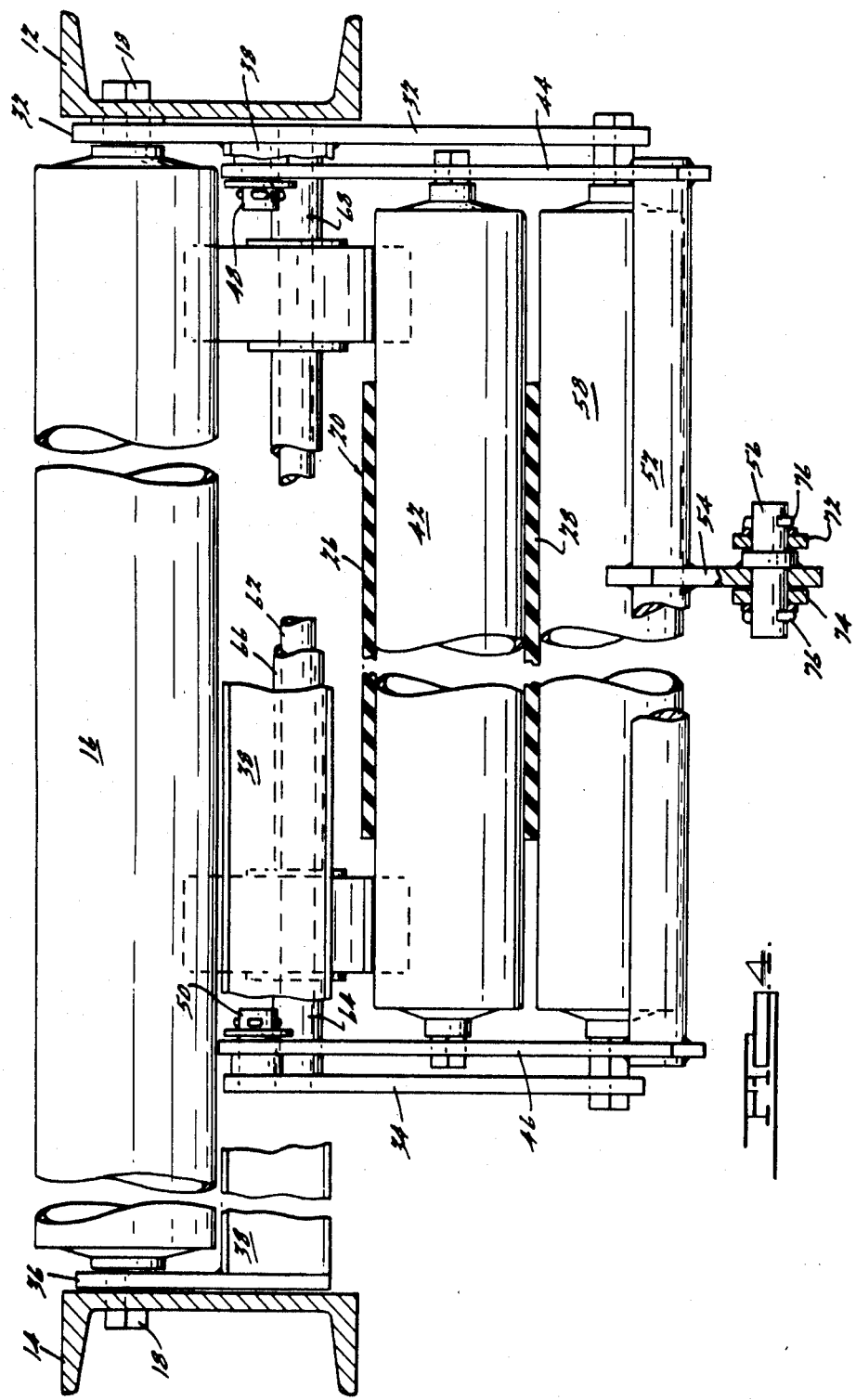

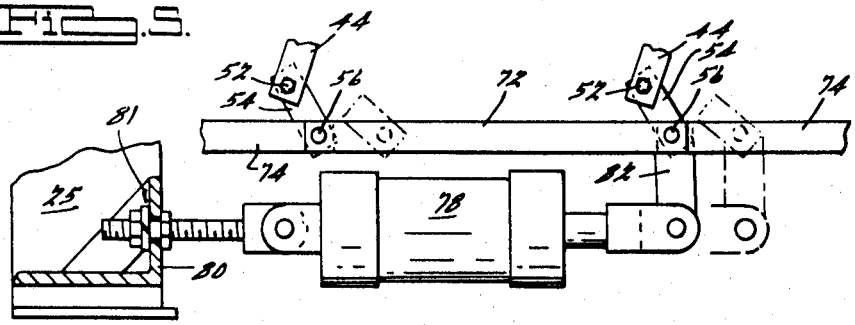
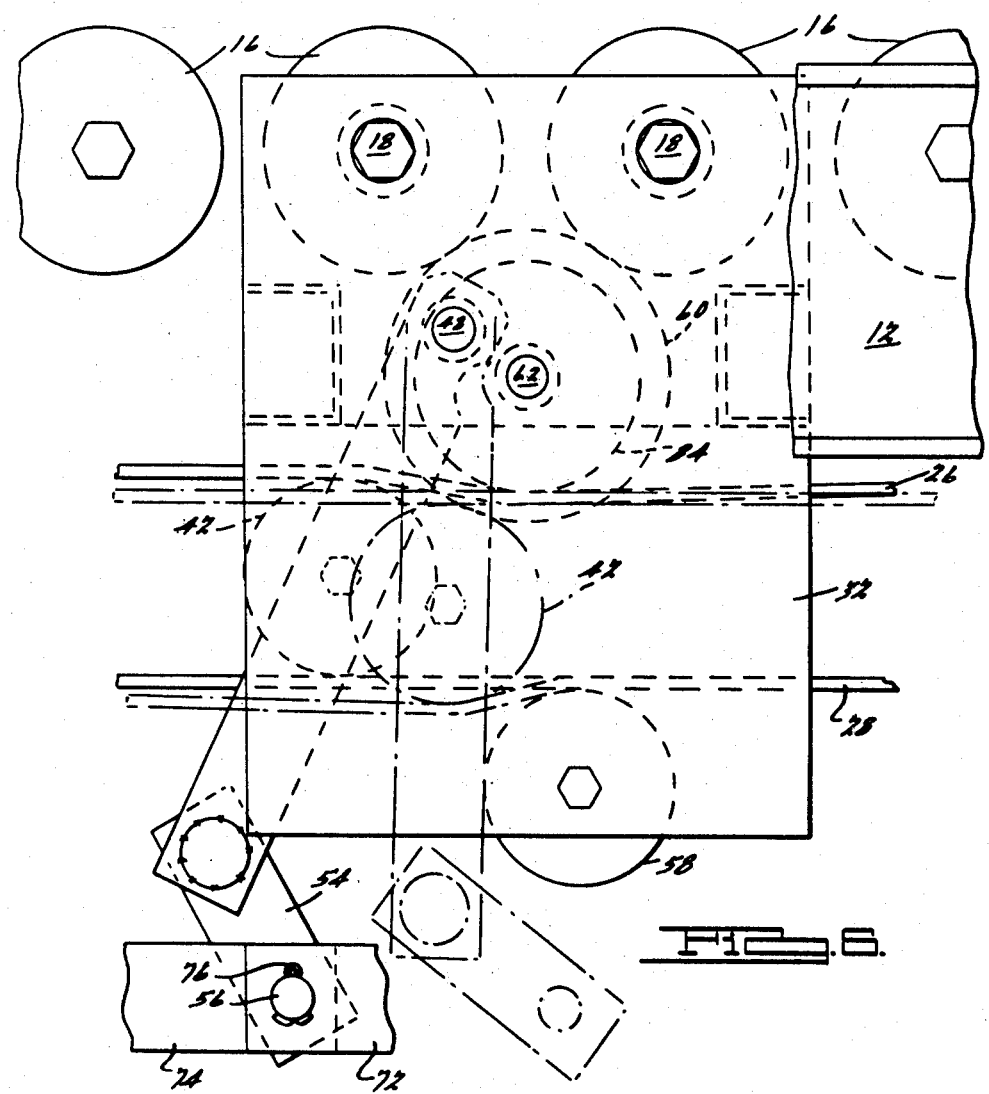

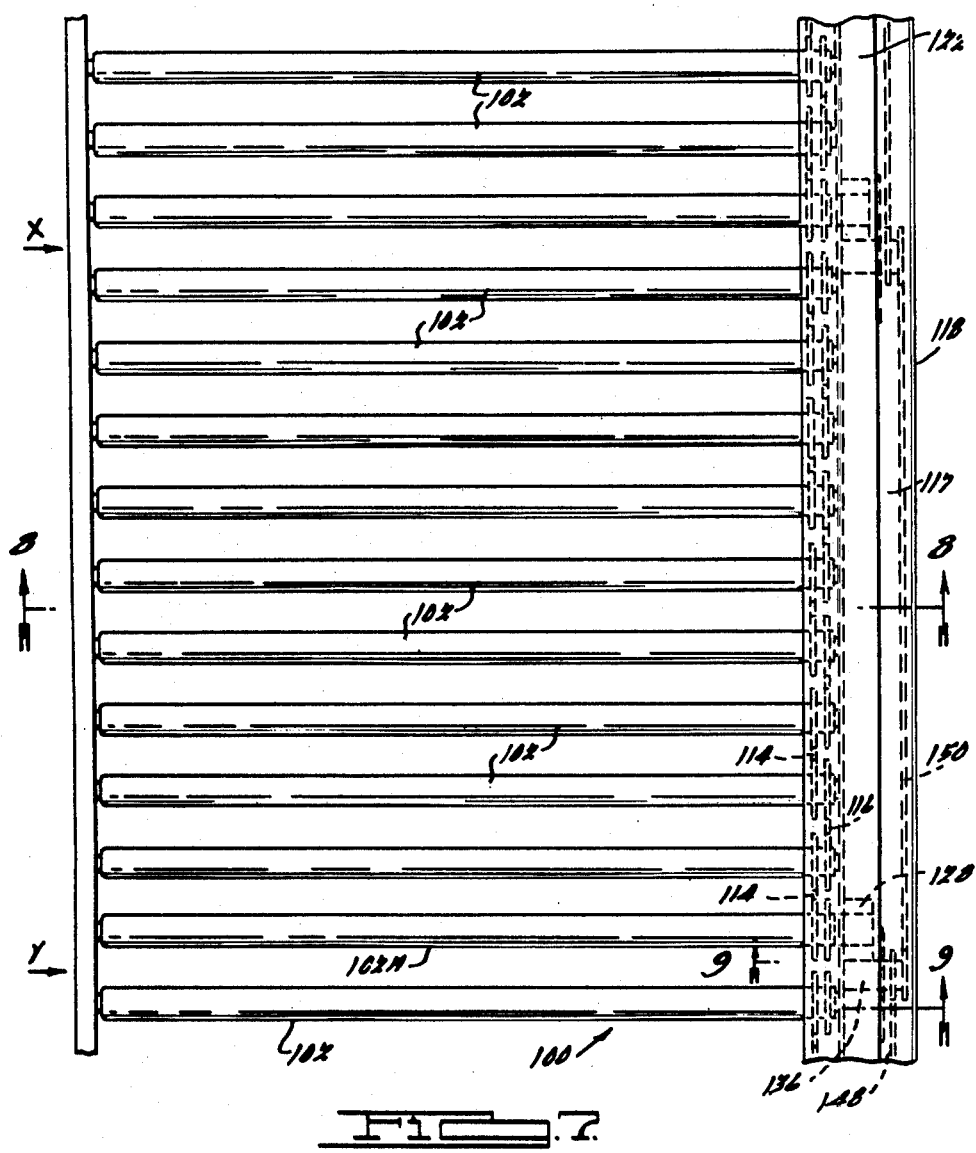
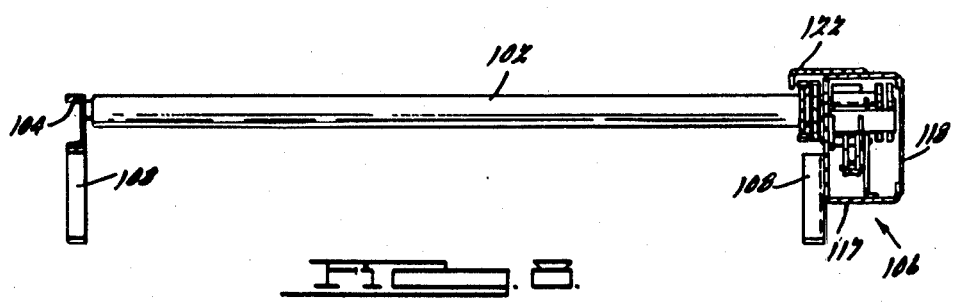

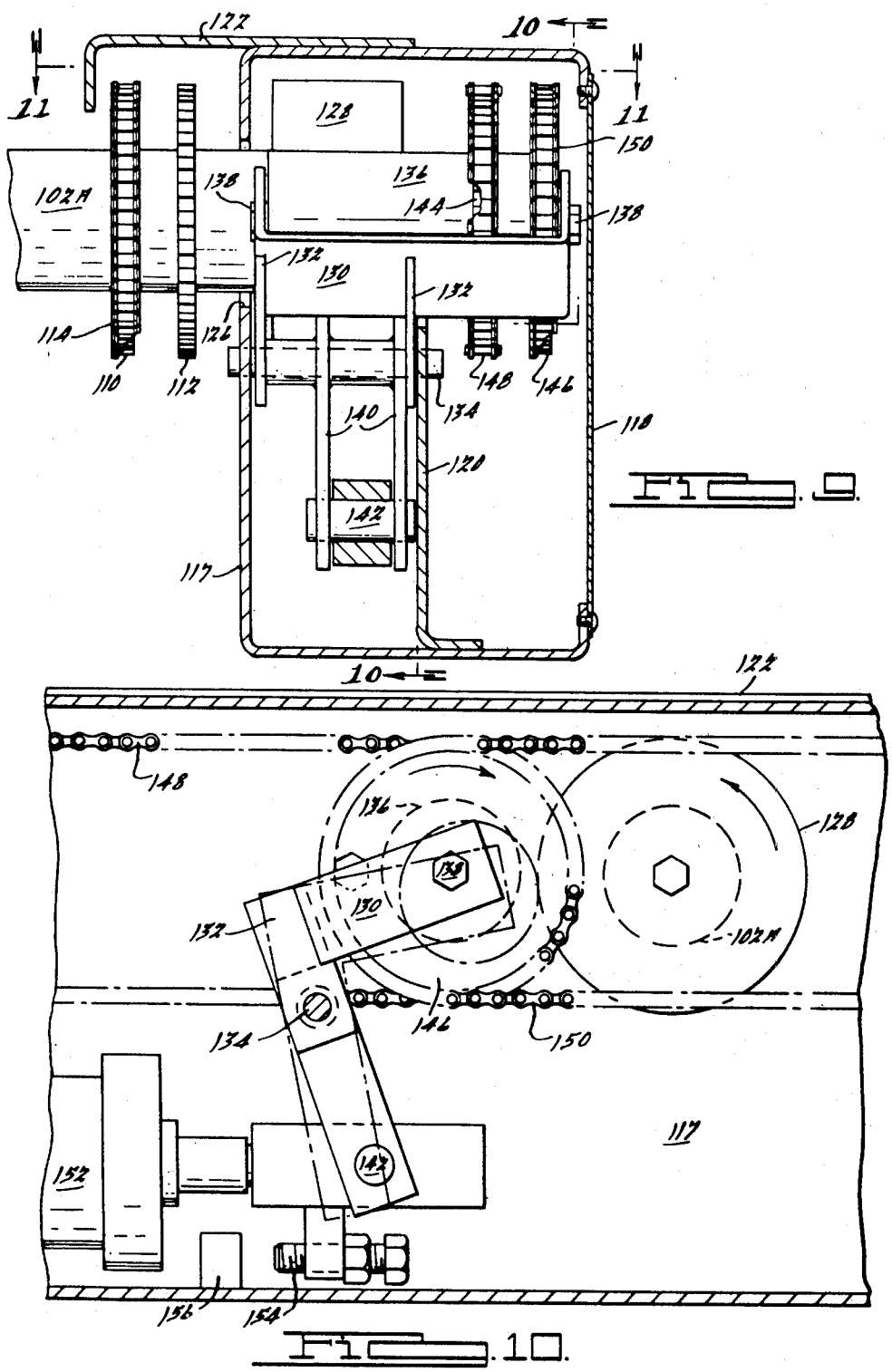

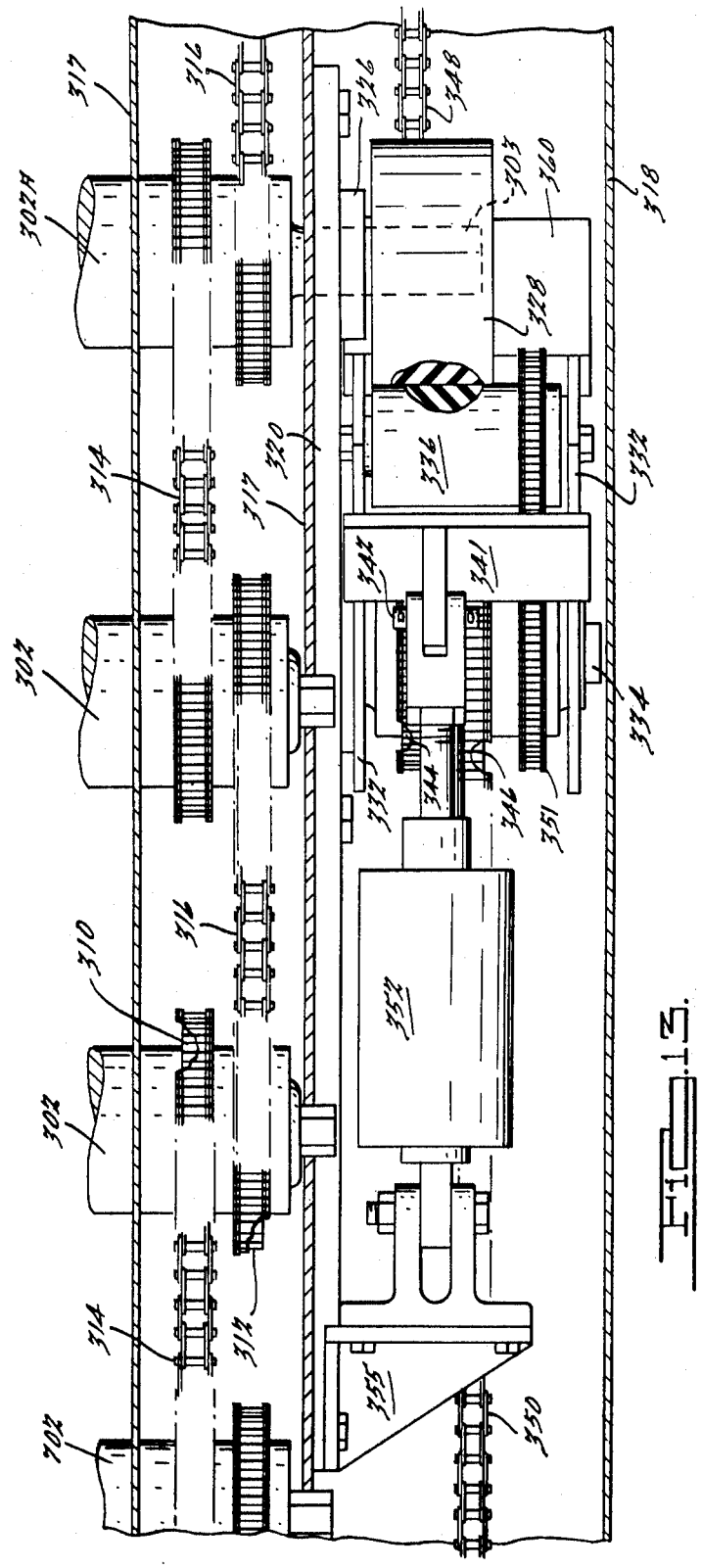

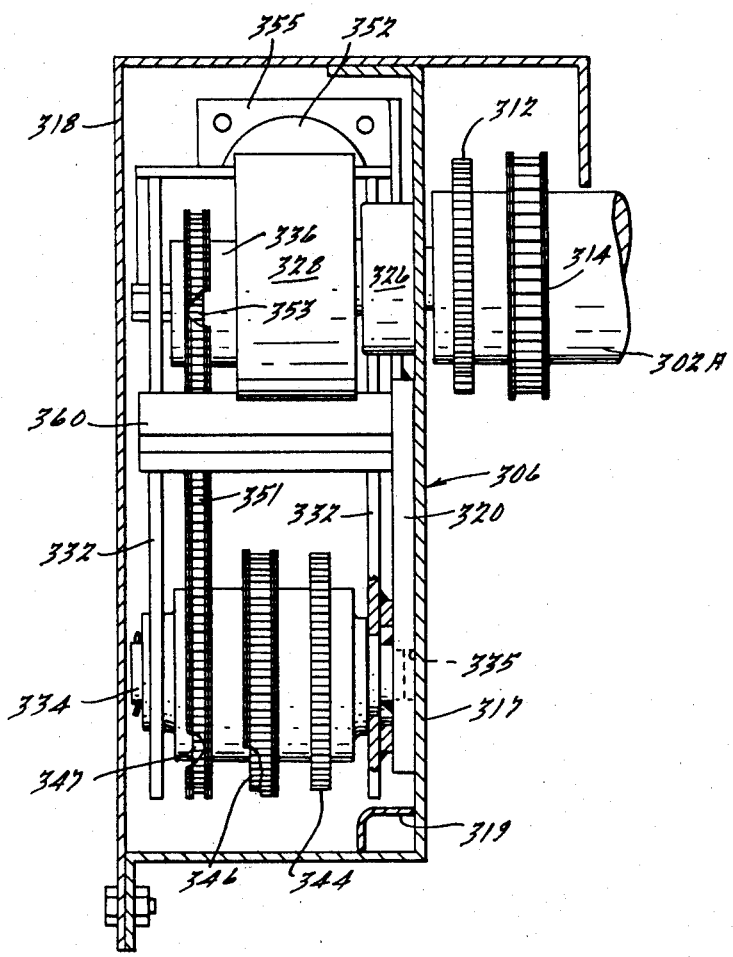

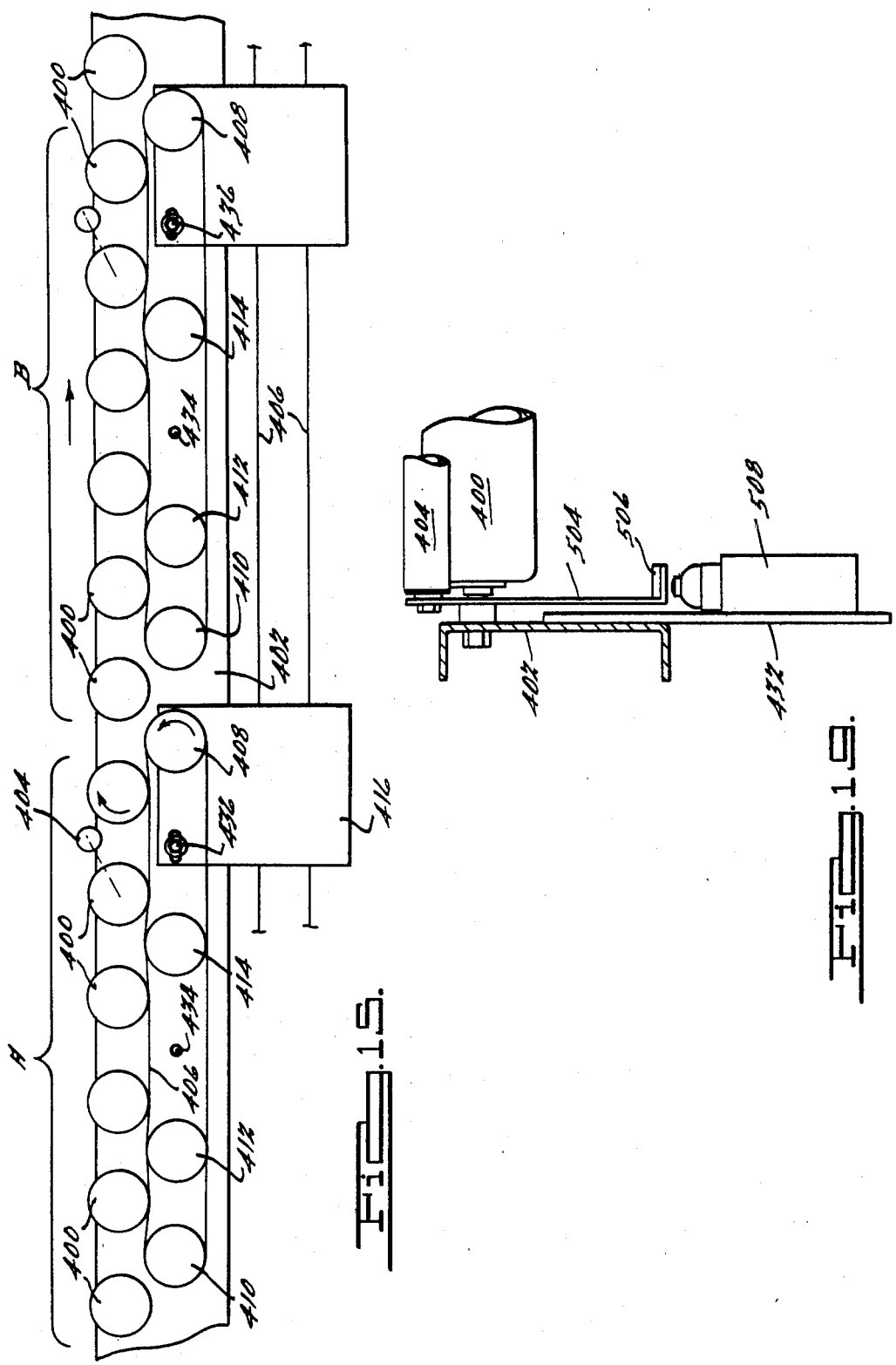

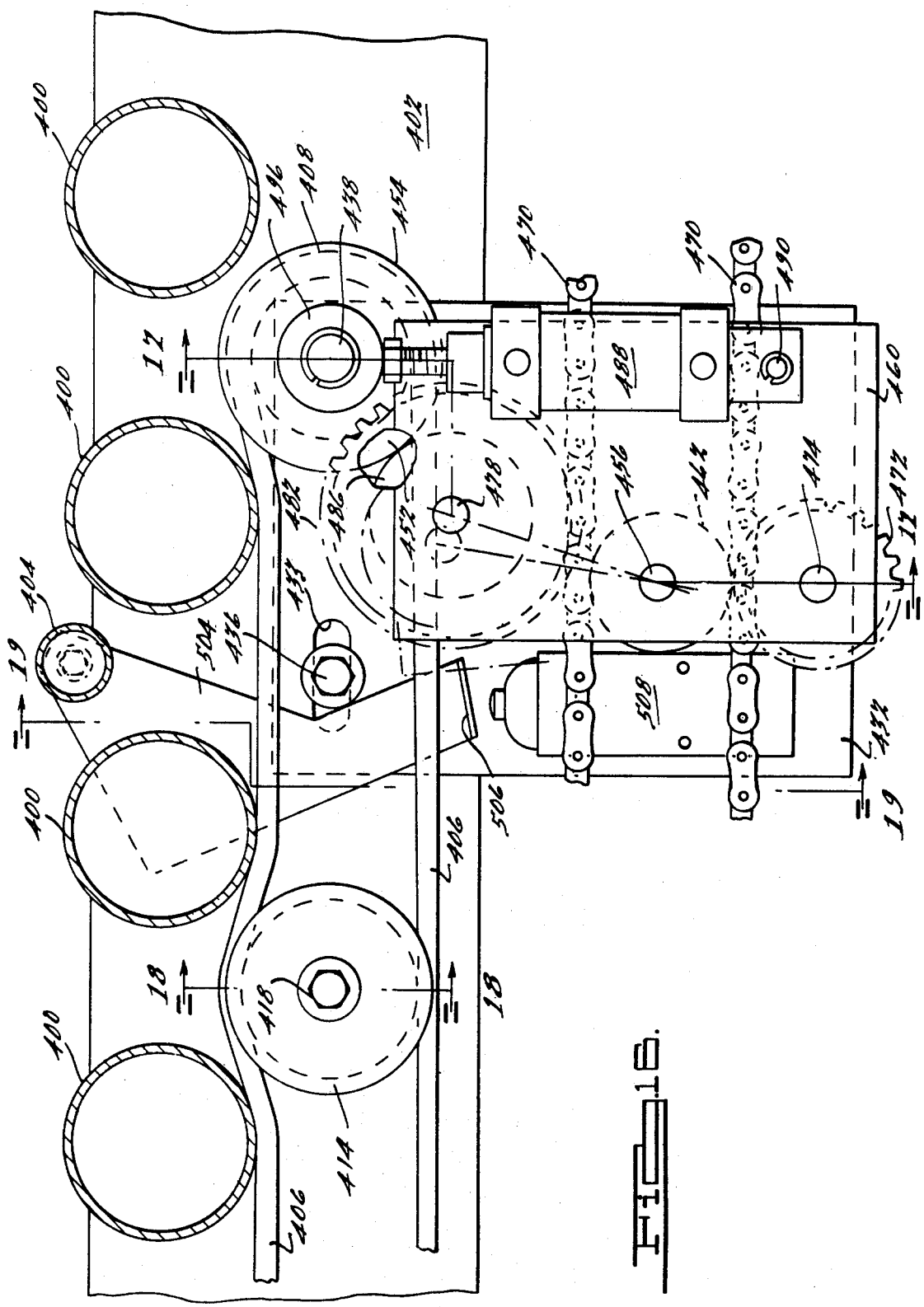

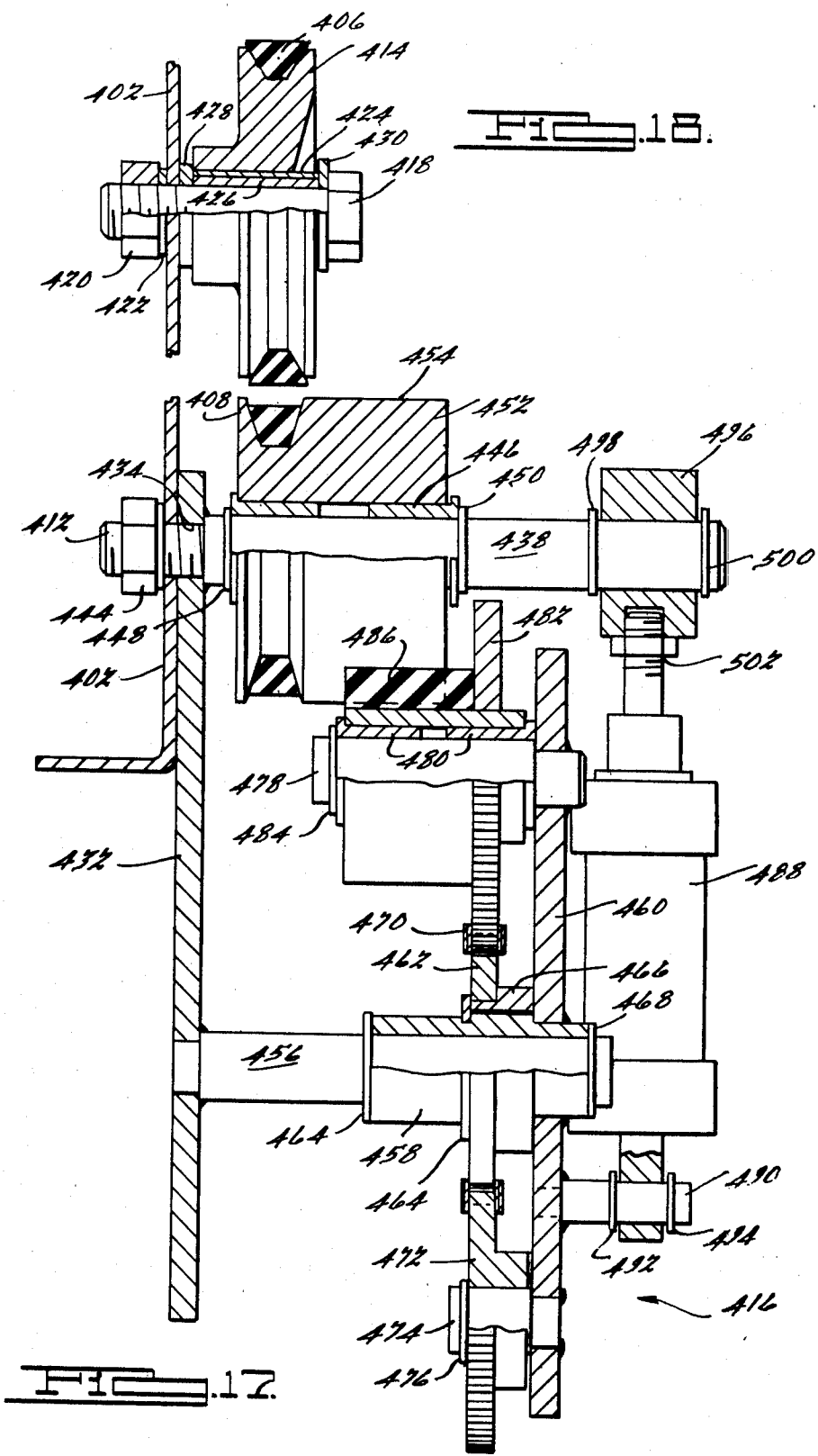

ACCUMULATING CONVEYOR

CROSS REFERENCE TO RELATED APPLICATION

This is a division, of application Ser. No. 942,660, filed Sept. 15, 1978 now U.S. Pat. No. 4,301,914 which is a continuation-in-part of Ser. No. 831,756, filed on Sept. 9, 1977 abandoned, which is a continuation-in-part of Ser. No. 688,255, filed on May 20, 1976 abandoned.

BACKGROUND AND SUMMARY OF THE INVENTION

The present invention relates to powered roller conveyors, and particularly such conveyors which comprise a plurality of independently driveable accumulating zones. More specifically, the invention concerns the provision of improved friction wheel drive means for powering the load carrying rollers in any zone of the conveyor, independently of all other zones, while utilizing a single power source for the entire conveyor.

Important objects of the present invention reside in the provision of improved roller conveyor drive means: which may be bi-directional in operation; which is operable to permit accumulation independently in any one or more zones of the conveyor utilizing a common power source for the entire conveyor; which permits "zero pressure" accumulation whereby controlled spacing is maintained between the articles conveyed (thus eliminating storage line pressure between the articles); which may be controlled to permit conveyed articles to be released singularly or in a train; which can be used as a merger or sorting main line and still retain full accumulation features; which is readily suited for use with conventionally used article sensors and other standard hardware in accordance with established techniques; which has a relatively low profile and may be of any practical width; which in certain embodiments may permit "free wheeling" of the load carrying rollers when nonpowered, whereby gravity or other conveying may take place in either direction in the nonpowered zone (i.e., no "free wheeling" upon power failure), or which in other embodiments may permit automatic braking of the load carrying rollers when nonpowered; which is adapted for use on both belt powered and chain powered conveyors and may be easily adapted for different length accumulating zones and/or roller spacing and roller size; which may have a variety of zone lengths in a single conveyor; which incorporates individual drive modules which may be easily added to an existing roller conveyor to provide an accumulating function; which is capable of transmitting relatively high and yet adjustable drive forces with relatively modest actuating forces; which is capable of having zone lengths easily changed after installation if zone length requirements should change; and, which is relatively simple in construction, utilizing primarily standard readily available conveyor components and having a fully enclosed drive.

Another important object of the present invention resides in the provision of a belt powered accumulating roller conveyor having a plurality of modular type drive units of identical construction which may be individually hung wholly or partially from the load carrying roller shafts wherever desired throughout the length of the conveyor, whereby they are always properly located with respect to the load carrying rollers to be driven thereby, and may be varied in number depending on the forces required in a given application. A related object concerns the provision of such a conveyor having means for maintaining constant belt length regardless of the number of zones being powered at any given time.

These and other objects, features and advantages of the present invention will become apparent from the subsequent description of the appended claims, taken in conjunction with the accompanying drawings.

BRIEF DESCRIPTION OF THE DRAWINGS

FIG. 1 is a side elevational view of a first embodiment of an accumulating roller conveyor embodying the principles of the present invention;

FIG. 2 is an enlarged fragmentary plan view of a portion of the conveyor shown in FIG. 1, with certain portions broken away;

FIG. 3 is an enlarged side elevational view looking generally in the direction of arrow 3 in FIG. 2, with certain portions broken away;

FIG. 4 is a transverse sectional view taken along line 4—4 in FIG. 3;

FIG. 5 is a fragmentary side elevational view of one actuating means on the conveyor shown in FIG. 1;

FIG. 6 is an enlarged side elevational view similar to FIG. 3, but illustrating a modified form of the first embodiment;

FIG. 7 is a plan view of a portion of a second embodiment of an accumulating roller conveyor embodying the principles of the present invention;

FIG. 8 is a transverse sectional view taken along line 8—8 in FIG. 7;

FIG. 9 is an enlarged transverse sectional view taken along line 9—9 in FIG. 7;

FIG. 10 is a fragmentary longitudinal sectional view taken along line 10—10 in FIG. 9;

FIG. 13 is a plan view of a portion of the conveyor illustrated in FIG. 12, with certain parts broken away;

FIG. 14 is a fragmentary end elevational view, partly in section, of the right hand end of the conveyor shown in FIG. 12;

FIG. 15 is a fragmentary side elevational schematic view of a fourth embodiment of an accumulating roller conveyor embodying the principles of the present invention;

FIG. 16 is a side elevational view of a portion of the conveyor of FIG. 15 looking outwardly from the center thereof and showing the drive module thereof;

FIG. 17 is a transverse vertical sectional view taken generally along line 17—17 in FIG. 16;

FIG. 18 is a transverse vertical sectional view taken generally along line 18—18 in FIG. 16; and FIG. 19 is a fragmentary transverse vertical section taken generally along line 19—19 in FIG. 16.

DETAILED DESCRIPTION OF THE PREFERRED EMBODIMENTS

Figure 11:
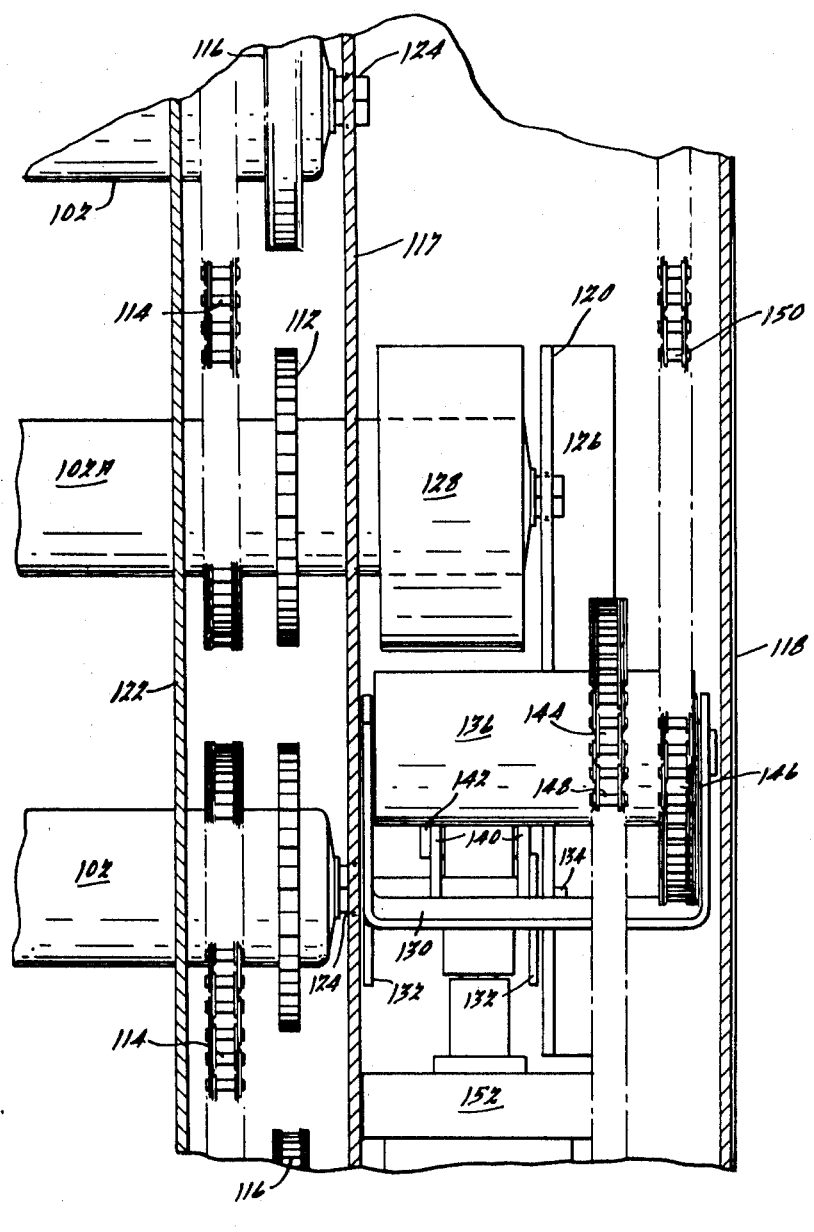
FIG. 11 is a fragmentary longitudinal sectional view taken along line 11—11 in FIG. 9.

The accumulating roller conveyor shown at 10 in FIG. 1 may be of any conventional overall design, having any number and length of accumulating sections and any configuration desired, using conventional parameters. This conveyor comprises longitudinally extending side rails 12 and 14 of channel-shaped configuration between which are disposed a plurality of conventional steel load carrying rollers 16 arranged in generally parallel side-by-side relationship for the full longitudinal extent of the conveyor to define a load carrying surface along the top thereof. Suitable transverse braces (not shown) may also be provided to rigidify the structure. Each of the rollers 16 is rotationally mounted in the usual manner on a transversely extending through shaft 18, the ends of which are hex shaped in cross-section and disposed within similarly shaped holes longitudinally spaced along the length of each of the side rails, in the conventional manner. Side rails 12 and 14 are supported above the floor, indicated generally at 23, by means of a plurality of short vertical columns 25. The embodiment of FIGS. 1–6 is powered by an endless belt 20 of conventional construction. Rollers may be of any desired width and belt 20 is chosen in accordance with standard criteria in order to accommodate the loads contemplated. Belt 20 is powered by conventional drive means, indicated generally at 22, located at one end of the conveyor, and conventional belt take-up means, indicated generally at 24, is provided at the opposite end of conveyor. Belt 20 thus extends for the full length of the conveyor beneath all load carrying rollers 16 and has an upper course 26 which is continuously driven in one direction and a lower course 28 which is continuously driven in the opposite direction when the conveyor is operating. The mechanism by which movement of belt 20 is transmitted into driving forces to operate the conveyor is the heart of the present invention.

Generally speaking, the drive means of the present invention comprises a plurality of individual drive units, indicated generally at 30. Each drive unit 30 comprises a welded frame which is formed of a side plate 32 (on the right in FIG. 2), a mid plate 34 and another side plate 36 (left hand of FIG. 2), all of which are rigidly connected together in an integral assembly by means of transversely extending channel shaped members 38, as best illustrated in FIGS. 2 and 4. Each side plate 32 is provided with a pair of holes 40 therein whereby the side plate and the remaining assembly affixed thereto may be supported by simply hanging same on shafts 18 of two load carrying rollers 16, as best seen in FIG. 3. Side plates 36 are similarly hung from a pair of shafts at the opposite end of the load carrying rollers. If desired, spacers may be provided between the inside of the side rails and the outside surfaces of side plates 32 and 36 to accommodate any dimensional variations. Because each assembly is supported on two shafts there is no tendency for the latter to pivot or otherwise move from a fixed position. Furthermore, because all of the load carrying rollers are equally spaced apart, the drive units may be mounted on any pair of adjacent rollers and with any desired spacing therebetween, thus providing a substantial degree of flexibility in design. The higher the load carrying requirements, the greater the number of drive units 30 which should be utilized per given length of conveyor.

As best seen in FIGS. 3 and 4, the upper course 26 of the belt is supported in each drive unit by means of a pressure roller 42, which may be in the form of a standard steel conveyor roller, journalled at its ends by means of a pair of brackets 44 and 46. The upper end of brackets 44 and 46 are pivotally supported by stub shafts 48 and 50, respectively, affixed to side and mid plates 32 and 34, respectively, in the manner best illustrated in FIG. 4. The lower ends of brackets 44 and 46 are joined by means of a transversely extending bar 52, as by welding or the like. Bar 52 has rigidly affixed thereto a downwardly extending link 54 having rigidly affixed thereto a transversely extending pin 56. As can thus be visualized, the application of forces in the longitudinal direction to pin 56 in opposite directions will cause brackets 44 and 46, and the roller 42 carried thereby, to move back and forth between the two positions illustrated in FIG. 3. In both positions the upper course 26 of the belt will be supported by roller 42. As illustrated in FIG. 3, the normal at-rest condition of the mechanism is illustrated in solid lines (dashed where hidden) and the actuated or driving position is illustrated in phantom lines. The lower course 28 of the belt is supported in each drive unit by means of an idler roller 58, which may be in the form of a conventional steel conveyor roller, journalled to the lower extremities of side plate 32 and mid plate 34, in the manner best illustrated in FIGS. 3 and 4.

Also disposed between side plate 32 and mid plate 34 are a pair of friction wheels 60 which straddle belt 20 and are rotatably mounted on a shaft 62, the ends of which are affixed to plates 32 and 34. Friction wheel 60 may be formed of any suitable material having relatively high frictional surface characteristics, such as an elastomeric material such as rubber, and the wheels are maintained in transverse position on shaft 62 by means of spacer sleeves 64, 66 and 68 in the manner best illustrated in FIG. 2. Friction wheels 60 are so positioned that they frictionally engage an adjacent pair of load carrying rollers 16, in particular the rollers from whose support shafts the particular drive unit depends. Thus, rotation of the friction wheels will cause rotation of the pair of load carrying rollers frictionally engaged therewith.

The manner of operation of the conveyor, whereby driving forces are transmitted from belt 20 to the load carrying rollers, may be best visualized with reference to FIG. 3. The conveyor is bi-directional, meaning that the belt can be driven in either direction for movement of the load in either direction; however, for exemplary purposes the load, indicated at 70, is shown moving to the left, with the load carrying rollers rotating in a counterclockwise direction. In the at-rest condition of the mechanism, there is no driving engagement whatsoever between belt 20 and friction wheels 60, as a consequence of which there are no driving forces exerted on the load carrying rollers, and the latter act as a simple nonpowered or gravity-type conveyor. In order to cause belt 20 to drive the load carrying rollers in a given drive unit, pin 56 in that unit is biased to the right as shown in FIG. 3 to move pressure roller 42 to its driving position indicated in phantom lines. The parts are so arranged that when pressure roller 42 is moved to its driving position, it frictionally engages friction wheels 60 and at the same time tends to pinch or crimp the lower course 28 of the belt against idler roller 58 to cause the belt to assume the crimped position indicated in phantom lines in FIG. 3. The pinching or crimping of the belt between pressure roller 42 and idler roller 58 causes the movement of the belt to be transmitted to the pressure roller, which in turn transmits its rotational movement to the friction wheels which then cause the load carrying rollers to rotate and propel the load in the direction indicated.

It has been discovered that the geometry of the present drive system is such that actuation of the mechanism by moving pin 56 to the right tends to be self-energizing in the sense that it takes relatively little actuating force to cause a substantial power transmission from the belt to the friction wheels. It is believed that one important facet of the design which gives this result is the manner in which the surface of pressure roller 42 approaches the surface of the friction wheels at a very oblique angle, thus providing a wedging type engagement which causes high frictional forces and permits transmission of substantial forces. Technically speaking, the pivot point of brackets 44 and 46 is so arranged with respect to the rotational axis of friction wheels 60 and pressure roller 42 that at the point of engagement of the pressure roller and friction wheels, when the pressure roller is moved to its driving position, a tangent to the path of movement of the pressure roller about its pivotal axis is disposed at an oblique angle with respect to a tangent to the periphery surface of the friction wheels at the same point. This angle is preferably less than 35° and has a preferred range of approximately 15° to 35°. In the mechanism disclosed this angle is approximately 30°, and it has been found to give very satisfactory results. The fact that the pressure roller moves downwardly into its driving position, and is thus assisted by gravity, is an additional enhancing factor.

The present conveyor, being operable as a conventional accumulating conveyor, comprises a plurality of consecutive zones extending end to end longitudinally for the extent of the conveyor. In the embodiment illustrated in FIG. 1, one such zone is disposed between the two vertical columns 25. Any number of additional such zones, of any desired length, may be provided from this particular zone to either end of the conveyor. Because all of the zones are the same, only the center zone illustrated in FIG. 1 will be described, for exemplary purposes. An accumulating zone is defined as a zone on the conveyor which can be powered and non-powered completely independently of the remainder of the conveyor. This permits the accumulation of articles or the like at any point on the conveyor by merely deactivating and rendering nonpowered the zone where such accumulation is desired.

In the present invention, actuation and deactivation of a given zone of the conveyor is accomplished by the mechanism most clearly illustrated in FIGS. 1 and 5. As can be seen, when it is desired to create a zone it is merely necessary to interconnect all of pins 56 for all the drive units in the zone, this being accomplished by means of alternating linkages 72 and 74 which are retained in place on pin 56 by conventional cotter keys 76 or the like. A single actuating means is provided in each zone in the form of a piston and cylinder fluid motor 78 the cylinder of which is pivotally connected to a support bracket 80 affixed to one of the vertical columns 25 by means of an adjustable connection 81, in the manner illustrated in FIG. 5. The rod end of motor 78 is pivotally connected to the series of linkages 72 and 74 by a link 82 pivotally connected at one end to the rod eye and fixed at the other end to one of the pins 56 or linkages 72 or 74. Thus, when fluid under pressure is supplied to the left side of the piston within motor 78 the rod will extend to the right as viewed in FIG. 5, which will cause all of the pressure rollers 42 to be urged to the right as viewed in FIG. 3 to cause driving forces to be transmitted from lower course 28 of the belt to the load carrying rollers and hence the load. The driving position of the linkages and rod end of the motor are illustrated in phantom lines in FIG. 5. On the return stroke of motor 78, which can either be caused by fluid under pressure or by an internal biasing device if the motor is single acting, all of the pressure rollers 42 within the zone will be moved to their at-rest positions, to the left as viewed in FIG. 3, in which no driving forces are transmitted to the load carrying rollers. The degree to which pressure roller 42 will be wedged between the belt and friction wheels 60, which controls the magnitude of force transmitted, may be varied by adjusting connection 81.

A modified version of the belt drive unit of the first embodiment of the invention is illustrated in FIG. 6. The drive unit of FIG. 6 is identical in all respects to the previously described drive units, with the sole exception that a conventional steel conveyor roller 84 is rotationally mounted on shaft 62 between friction wheels 60, roller 84 being of such a diameter as to downwardly deflect the upper course 26 of the belt in the manner clearly illustrated in FIG. 6. As can be seen, the lower surface of roller 84 is slightly lower than the top surface of pressure roller 42, as a consequence of which a small crimp is introduced into the upper course of the belt. The lower course 28 of the belt rests on idler roller 58, as in the previous arrangement. Both courses of the belt are shown in solid lines when the mechanism is at its at-rest or non-driving condition. When the mechanism is actuated to its driving condition and pressure roller 42 moves from its solid line position to its phantom line driving position and the lower course of the belt is progressively crimped to create the friction necessary to transmit driving forces, simultaneously therewith there is a reduction in the crimp of the upper course of the belt, as can be visualized by viewing the change in configuration of the upper course of the belt between its at-rest solid line position and its phantom line driving position. Thus, if the crimp initially introduced into the upper course of the belt by roller 84 is substantially the same as the crimp ultimately placed in the lower course of the belt during driving, there is thereby provided a technique for maintaining constant belt length, regardless of the number of drive units activated and regardless of the degree to which crimps may be introduced therein during actuation. In long conveyors, where a substantial number of the load carrying rollers may be driven at one time, the effective shortening of the belt length by virtue of the formation of a large number of crimps therein may warrant the utilization of a mechanism of the type illustrated in FIG. 6, which readily solves this problem.

As will be appreciated, the respective rollers in the first embodiment of the drive means of the present invention each provide several different functions. For example, each pressure roller acts both as a drive roller to transmit driving forces from the belt to the friction wheels, and as a support or idler roller for supporting the upper course of the belt. In the modification of FIG. 6, the pressure rollers perform the additional function of maintaining belt length. In addition, each idler roller serves both as a support or idler roller bar supporting the lower course of the belt, and as a backup roller to create the reaction forces necessary in the driving mode of the mechanism to crimp the belt.

Conveyor 100 of FIGS. 7-11 is also an accumulating roller conveyor, the primary difference being that it is chain driven rather than belt driven. Generally speaking, the second embodiment of the invention comprises a plurality of load carrying rollers 102 rotatably mounted between a longitudinally extending side rail 104 on one side and a longitudinally extending hollow frame structure 106 on the opposite side. The conveyor is supported on the floor by means of longitudinally spaced vertical columns 108, in the usual manner. Since the conveyor comprises a plurality of accumulating zones, and since all of the zones are substantially identical, except for possibly length, only one zone will be discussed. A single zone is illustrated in FIG. 7 between the points indicated by the arrows x and y. Each load carrying roller 102 in a given zone is provided with a pair of sprockets 110 and 112 adjacent the right hand end thereof and is interconnected by chains 114 and 116 engaging sprockets 110 and 112, respectively. This is accomplished in the normal manner, for example, by interconnecting sprockets 110 on the first and second rollers by means of a chain 114, the second and third rollers by means of a chain 116 on sprockets 112, the third and fourth rollers by means of a chain 114 on sprockets 110, and so on. Thus, rotation of any load carrying roller within a zone will cause rotation of all rollers within that zone.

Frame structure 106 generally comprises a longitudinally extending C-shaped member 117 the right-hand face of which is openable for access to the mechanism, but is normally closed by suitable cover plate 118. In the drive unit area of member 117 there is also provided a vertically upstanding bracket 120, and for the entire length of member 117 there is provided a guard 122 arranged to substantially cover sprockets 110 and 112 and the chains carried thereby. In this embodiment the entirety of the drive mechanism is fully enclosed. As can be seen best in FIGS. 9 and 11, all of the load carrying rollers 102 are pivotally journalled on shafts supported by the inner wall of member 117, as indicated at 124, with the exception of one roller, indicated at 102A, which passes through a suitably sized opening 126 in the inner wall of member 117 and is rotatably journalled on a shaft supported by bracket 120, as indicated at 126. Rigidly affixed on the outside surface, adjacent the end, of each roller 102A, within the enclosure defined by member 117, is a friction wheel 128 formed of a suitable frictional material, such as an elastomeric material or the like, having the desired characteristics.

Also disposed within the enclosure defined by member 117 is a generally U-shaped bracket 130 which is pivotally mounted by means of a pair of arms 132 on a shaft 134 extending between the inner wall of member 117 and bracket 120, as best illustrated in FIG. 9. Rotatably disposed between the legs of bracket 130 is a pressure roller 136, which may be of conventional steel roller construction, supported by a shaft 138 disposed in suitably sized and shaped apertures in the legs of bracket 130. Rigidly affixed to and depending from bracket 130 and arms 132 are a pair of arms 140 which are interconnected at the lower ends thereof by means of a transversely extending pin 142. The outer end of pressure roller 136 is provided with a pair of sprockets 144 and 146 for transmitting driving forces between the zones of the conveyor. As can be visualized with reference to FIG. 7, the zone illustrated is connected by means of a chain 148 on sprockets 144 with the next adjacent zone towards the bottom of the drawing, and via a chain 150 between sprockets 146 with the next adjacent zone towards the top of the drawing, and so on for the entire length of the conveyor. At some point on the conveyor one of the chains 148 or 150 is driven by a conventional power source (not shown) so that at all times during which the conveyor is in operation chains 148 and 150 are being driven on a continuous basis. The transmission of these continuous driving forces to the load carrying rollers in a given zone is accomplished by the mechanism of the present invention.

As can be seen in FIG. 10, each zone of the conveyor is provided with a conventional piston and cylinder fluid motor 152, disposed within the enclosure of member 117, the rod eye of motor 152 being connected to pin 142. Thus, actuation of the motor to the left will cause bracket 132 to move from its solid line position indicated in FIG. 10 to its phantom line position and actuation of the motor to the right will cause the bracket to return to its solid line position. As illustrated, when the mechanism is in the position shown in phantom lines, no driving forces are transmitted by the pressure roller, which is driven continuously by chains 148 and/or 150, to the load carrying rollers. However, when motor 152 is actuated to cause bracket 130 to move from its phantom line position, pressure roller 136 is brought into frictional engagement with friction wheel 128 and this frictional engagement causes rotation of the pressure roller to be transmitted to the friction wheel and thence to load carrying roller 102A, from which rotation is transmitted to all of the load carrying rollers in a given zone via chains 114 and 116. The horizontal component of movement of sprockets 144 and 146 is so slight that any slack created in chains 148 and 150 should not be a problem. If it is found to be excessive, a standard chain tightener may be added in the vicinity of the mid point thereof. In this embodiment, as in the previous embodiment, the mechanism is believed to have self-actuating tendencies which yield surprisingly high drive forces. This is believed to be a direct result of the oblique angle at which the path of the periphery of the pressure roller intersects the surface of the friction wheel as the former is rotated about the axis of shaft 134. The angular ranges and preferred angle recited above with respect to the first embodiment are also applicable to the second embodiment of FIGS. 7-11. There is also a toggle effect as pressure roller 136 approaches the line intersecting the axes of rotation of friction wheel 128 and bracket 130, thus enhancing force transmission. If desired, an adjustable stop may be provided to accommodate adjustments in the amount of engagement of the pressure roller and friction wheel, which will vary the drive forces transmitted, and to prevent motor 152 from actuating the pressure roller past dead center with respect to the friction wheel. This stop may comprise an adjustable threaded bolt element 154, which is engageable with a fixed stop element 156, as best illustrated in FIG. 10.

Figure 12:
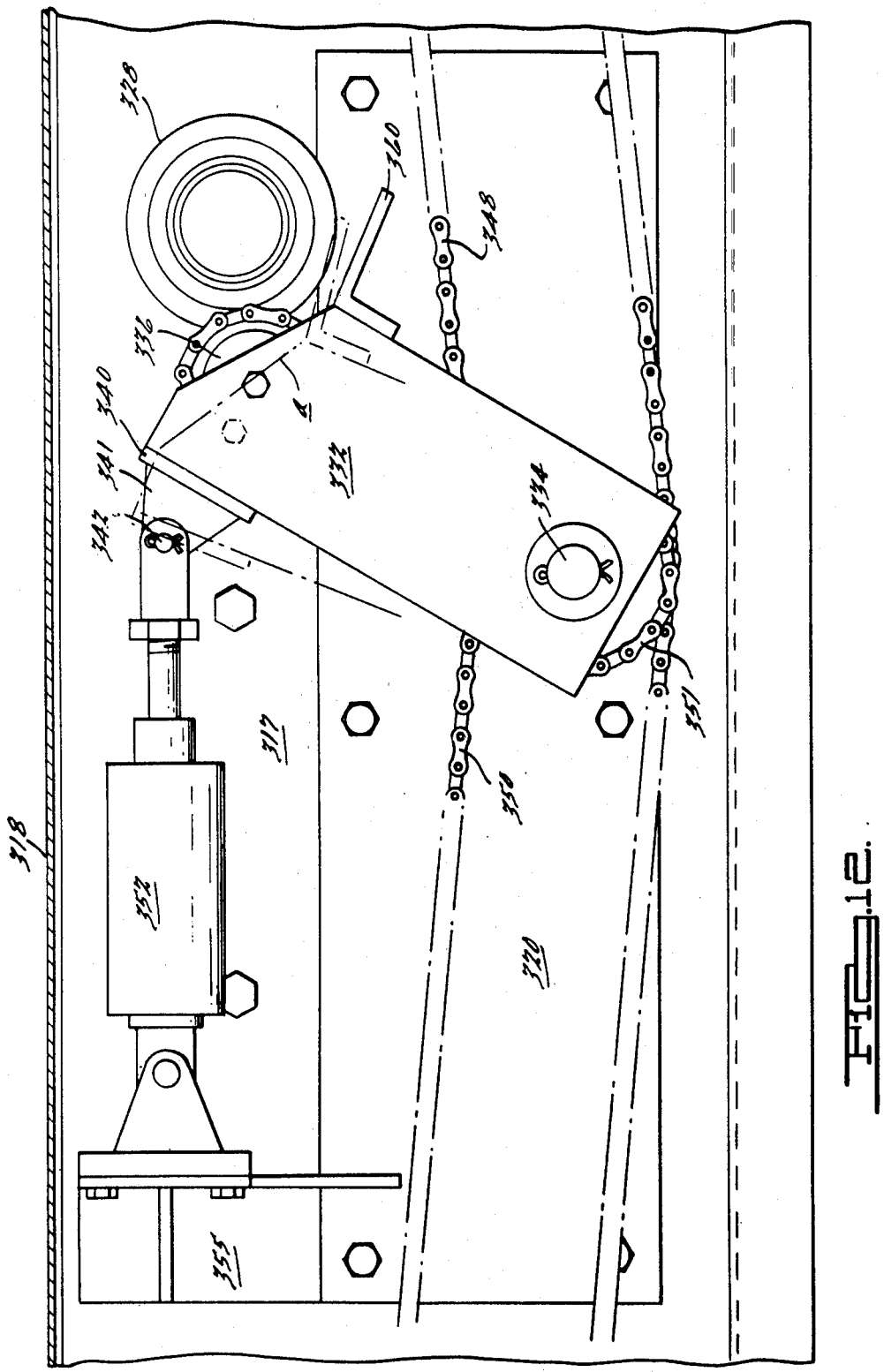
FIG. 12 is a fragmentary side elevational view, partly in section, of a third embodiment of an accumulating roller conveyor embodying the principles of the present invention.

The conveyor of FIGS. 12-14 is also a chain driven accumulating roller conveyor, the primary difference being that it is provided with means for maintaining constant chain length. Generally speaking, this third embodiment of the invention is very similar to the second embodiment and comprises a plurality of load carrying rollers 302 rotatably mounted between a longitudinally extending hollow frame structure 306 on one side and a longitudinally extending side rail (not shown) on the opposite side. The conveyor is supported on the floor by means of longitudinally spaced vertical columns (not shown) in the usual manner. Since the conveyor comprises a plurality of accumulating zones, and since all of the zones are substantially identical, except for possibly length, only one zone will be discussed.

Each load carrying roller 302 in a given zone is provided with a pair of sprockets 310 and 312 adjacent the end thereof and is interconnected by chains 314 and 316 engaging sprockets 310 and 312, respectively. This is accomplished in the normal manner, for example, by interconnecting sprockets 310 on the first and second rollers by means of a chain 314, the second and third rollers by means of a chain 316 on sprockets 312, the third and fourth rollers by means of a chain 314 on sprockets 310, and so on. Thus, rotation of any load carrying roller within a zone will cause rotation of all rollers within that zone.

Frame structure 306 generally comprises a longitudinally extending L-shaped member 317 the outside face of which is openable for access to the mechanism, but is normally closed by suitable cover plate 318. A longitudinally extending shield 319 may be provided to define a raceway to protect the electrical and fluid lines which may form part of the conveyor. In the drive unit area within structure 306 there is provided a vertical mounting plate 320 affixed to member 317. In this embodiment, as in the previous one, the entirety of the drive mechanism is fully enclosed. As can be seen best in FIGS. 13 and 14, all of load carrying rollers 302 are pivotally journalled on shafts supported by member 317, as indicated at 324, with the exception of one roller in each zone, indicated at 302A, which has a live shaft 303 passing through a suitably sized clearance opening in the inner wall of member 317 and is rotatably journalled in a bearing 326 affixed to plate 320. Adjacent the end of each roller 302A, within the enclosure defined by structure 306, is mounted a friction wheel 328 formed of a suitable frictional material, such as an elastomeric material or the like, having the desired characteristics.

Also disposed within the enclosure defined by structure 306 are a pair of arms 332 rotatably mounted on a stub shaft 334 welded to member 320, as best illustrated at 335 in FIG. 14. Rotatably disposed between arms 332 is a pressure roller 336, which may be of conventional steel roller construction, supported by a shaft 338 disposed in suitably sized and shaped apertures in arms 332. Rigidly affixed to and interconnecting arms 332 is a transversely extending plate 340 to which is affixed a mounting lug 341 which supports a transversely extending pin 342. Also journalled on stub shaft 334 are three sprockets 344, 346 and 347, which rotate together for transmitting driving forces between the zones of the conveyor and to the load carrying rollers. As can be visualized with reference to FIGS. 12 and 13, the zone illustrated is connected by means of a chain 348 on sprockets 344 with the next adjacent zone towards the right side of the drawings, and via a chain 350 between sprockets 346 with the next adjacent zone towards the left side of the drawings, and so on for the entire length of the conveyor. At some point on the conveyor one of the chains 348 or 350 is driven by a conventional power source (not shown) so that at all times during which the conveyor is in operation chains 348 and 350 are being driven on a continuous basis. Because the rotational axis of sprockets 344 and 346 does not move (as in the second embodiment) the effective length of the power chains does not change and power is transmitted therefrom to pressure roller 336 by means of a chain 351 driven by sprocket 347 and drivingly engaging a sprocket 353 affixed to pressure roller 336.

As can be best seen in FIGS. 12 and 13, each zone of the conveyor is provided with a conventional piston and cylinder fluid motor 352, disposed within the enclosure of structure 306 and mounted to plate 320 by a bracket 355, the rod end of motor 352 being connected to pin 342 in the usual manner. Thus, actuation of the motor to the left will cause arms 332 to move from their solid line position indicated in FIG. 12 to the phantom line position partially indicated at a, and actuation of the motor to the right will cause the arms to return to their solid line position. As illustrated, when the mechanism is in the position shown in phantom lines, no driving forces are transmitted by the pressure roller, which is driven continuously by chains 348 and/or 350, to the load carrying rollers. However, when motor 352 is actuated to cause arms 332 to move clockwise from their phantom line position, pressure roller 336 is brought into frictional engagement with friction wheel 328 and this frictional engagement causes rotation of the pressure roller to be transmitted to the friction wheel and thence to load carrying roller 302A, from which rotation is transmitted to all of the load carrying rollers in a given zone via chains 314 and 316. In this embodiment, as in the previous embodiments, the mechanism is believed to have self-actuating tendencies which yield surprisingly high drive forces. This is believed to be a direct result of the oblique angle at which the path of the periphery of the pressure roller intersects the surface of the friction wheel as the former is rotated about the axis of shaft 334. The angular ranges and preferred angle recited above with respect to the first and second embodiments are also applicable to the embodiment of FIGS. 12-14. There is also a toggle effect as pressure roller 336 approaches the line intersecting the axes of rotation of friction wheel 328 and arms 332, thus enhancing force transmission.

If desired, an adjustable stop may be provided, as in the second embodiment, to accommodate adjustments in the amount of engagement of the pressure roller and friction wheel, which will vary the drive forces transmitted, and to prevent motor 352 from actuating the pressure roller past dead center with respect to the friction wheel. In addition, a brake, such as shown at 360, may be connected between arms 332 and arranged to frictionally engage and stop friction wheel 328 when motor 352 is actuated to the left, as shown, to remove power from the load carrying rollers.

The fourth embodiment of the conveyor, shown in FIGS. 15-19, is somewhat similar to the second and third embodiments, except that it is provided with a V-belt drive for the load carrying rollers and also has a relatively simple, easy to install, drive module incorporating the powering and sensing means necessary to operate the conveyor. The third embodiment is a relatively heavy duty design ideally suited for the conveying of pallets, whereas the fourth embodiment is designed for a more medium duty application, such as the handling of packages.

Generally speaking, the fourth embodiment comprises a plurality of load carrying rollers 400 rotatably mounted between a pair of longitudinally extending channel-shaped side rails 402 in the usual manner. As illustrated schematically in FIG. 15, two accumulating zones of the conveyor are indicated at A and B, the conveyor being arranged for the movement of packages to the right as shown. Each zone comprises more than two load carrying rollers 400 and between the last two rollers thereof there is provided a package sensing roller 404 or equivalent device for controlling the accumulating functions thereof. All or most of the load carrying rollers in a given zone are controlled by a single V-belt 406, the leading end of which is powered by a pulley 408 and the trailing end of which is carried by a pulley 410. Between pulleys 408 and 410 are idler pulleys 412 and 414 which serve the purpose of holding V-belt 406 in frictional driving engagement with the bottom surface of load carrying rollers 400. The arrangement is such that counterclockwise actuation of pulley 408 causes belt 406 to move in the counterclockwise direction to frictionally drive each of the load carrying rollers 400 engaged thereby in the clockwise direction. Each zone of the conveyor is provided with an independently actuated power module, indicated generally at 416, for powering the pulley 408 controlling that zone.

In FIG. 18 there is shown a detail of how one of the pulleys 410, 412 or 414 is affixed to side rail 402. As shown, pulley 412 is rotatably mounted to side rail 402 by means of a machine screw 418 which passes through the center of the pulley and a suitably located aperture in side rail 402, the screw being held in place by means of a conventional nut 420 and lock washer 422. The center opening in pulley 412 is provided with a bearing 424 journalled upon a spacer 426 surrounding screw 418. A pair of thrust washers 428 and 430 are provided at the ends of spacer 426 to maintain the pulley in position and yet permit its free rotation.

The details of construction of each power module 416 are best illustrated in FIGS. 16 and 17. Power module 416 comprises a support plate 432 affixed to side rail 402 by hanging same from prepunched equally spaced pulley supporting apertures 434 provided along the length of side rail 402. The spacing of apertures 434 is the same as the spacing of load carrying rollers 400. Thus, the leading edge of support plate 432 is affixed to side rail 402 by means of a conventional threaded fastener 436 passing through an elongated aperture 433 in plate 432 and aperture 434 in side rail 402, and the trailing edge thereof by means of a stub shaft 438 welded to plate 432 and having a threaded projection 412 extending through adjacent aperture 434 and having a nut 444 threadably affixed thereto. Aperture 433 is elongated in the longitudinal direction so that the power module may be mounted on conveyors having different size load carrying rollers or different spacing of same. As can be seen, stub shaft 438 has journalled thereon, by means of a bearing 446, pulley 408, the position of the pulley being maintained by a pair of snap rings 448, 450. Pulley 408 is provided with an axially extending friction wheel portion or hub 452 having a cylindrical external drive surface 454.

Adjacent the lower end of support plate 432 there is affixed (as by welding) a second stub shaft 456 having a sleeve 458 journalled thereon to which is rigidly affixed a bracket 460 and a circular disc-like chain guide 462. Sleeve 458 is maintained in position by means of snap rings 464 and 468. Bracket 460 and sleeve 458 rotate together about the axis of shaft 456. Chain guide 462 is maintained in position by means of a snap ring 464 and a spacer 466.

Power is delivered to the drive module in each of the zones of the conveyor by means of a continuous single endless chain 470, the upper course of which is supported and guided on each of the modules by chain guide 462 and the lower course of which is supported and guided by the lower edge of chain guide 462 in cooperation with an idler sprocket 472 journalled upon a stub shaft 474 rigidly affixed (as by welding) to bracket 460 in a position below stub shaft 456. The sprocket is maintained in position on the stub shaft by means of a snap ring 476. At some location in the conveyor power is applied to chain 470, and in normal operation of the conveyor, chain 470 is always moving under power. It is the function of drive modules 416 to transmit power from the continuously moving chain to the respective zones of the conveyor in response to conventional control signals.

Also rigidly affixed (as by welding) to bracket 460 is a stub shaft 478 on which is journalled, by means of a split bearing 480, a sprocket 482 which is in continuous driving engagement with the upper course of chain 470. Sprocket 482 is maintained in position on stub shaft 478 by means of a snap ring 484 and has affixed thereto an elastomeric pressure roller 486. As can be visualized best in FIG. 16, rotation of bracket 460 about stub shaft 456 in the clockwise direction causes pressure roller 486 to move into frictional driving engagement with drive surface 454 on friction wheel portion or hub 452, and rotation in the opposite direction causes disengagement of such drive.

Bracket 460 may be actuated to and from its driving condition illustrated in solid lines in FIG. 16 by means of a pneumatic cylinder 488, the lower end of which is pivotally supported on a stub shaft 490 welded to bracket 460 (with snap rings 492 and 494 maintaining the relative position of the parts), and the upper end of which is provided with a sleeve 496 pivotally mounted on the outer free end of stub shaft 438. Sleeve 496 is maintained in position by snap rings 498 and 500, and a suitable threaded connection and lock nut may be used to adjust the relative initial stroke of the cylinder, as indicated generally at 502. Thus, actuation of the cylinder to cause it to extend will cause pressure roller 486 to move into driving engagement with drive surface 454, whereby power from chain 470 will be transmitted to V-belt 406 and the load carrying rollers 400 of the activated zone of the conveyor. In this embodiment, as in the previous embodiments, the mechanism is believed to have self-actuating tendencies which yield surprisingly high drive forces. This is believed to result from the oblique angle at which the path of the periphery of the pressure roller intersects the drive surface as it is rotated about the axis of shaft 456. The angular ranges and preferred angle recited above with respect to the first, second and third embodiments are also applicable to this fourth embodiment of FIGS. 15–19. There is also a toggle effect as the contact point on the pressure roller 486 approaches the line intersecting the axes of rotation of friction surface 454 and bracket 460.

The position of packages or articles being conveyed on the top of the conveyor in each zone is sensed by sensing roller 404, which is rotatably mounted upon a bracket 504 disposed at each end thereof and pivotally mounted to each of the side rails about the mounting shafts for the adjacent upstream load carrying roller 400, as best seen in FIG. 16. The lower end of bracket 504 is provided with an inwardly bent tab 506 which is adapted to engage an actuating valve 508 affixed to plate 432 to actuate same when sensing roller 404 is depressed by a package. Any type of pneumatic control system hardware and logic may be used, in accordance with standard criteria, including providing for operation in both directions, single or train release, zero pressure accumulation with no engagement of articles conveyed with one another, etc.

As can be visualized from FIGS. 16 and 17, there is no obstruction between the V-belt drives of adjacent zones of the conveyor. Consequently, it is very simple to increase the size of any given zone after installation by merely changing the length of the V-belt and, if necessary, relocating several of the pulleys and idlers. It is also to be noted, that the mechanism of the respective drive modules can be fully enclosed in the same manner as illustrated in FIG. 14 with respect to the previous embodiment. Because the V-belt is in constant frictional engagement with most of the load carrying rollers in a given zone, it has been discovered that upon deenergization of cylinder 488, or upon power failure, there is virtually no coasting or "free wheeling" of the articles being conveyed. This also prevents undesired movement of conveyed articles in the event the conveyor is inclined.

In all embodiments of the invention, conventional accumulating logic and standard sensing means may be used for detecting the need for accumulation and which zone or zones should be activated or deactivated. Similarly the sensing signal may be transmitted to the fluid motors of the activating means in accordance with state of the art practices. Also, in the places where forces are transmitted by frictional engagement of a rigid element and an elastomeric element, it should be appreciated that either one of the elements may be provided with the elastomeric material.

Thus, there is disclosed in the above description and in the drawings an improved accumulating conveyor which fully and effectively accomplishes the objectives thereof. However, it will be apparent that variations and modifications of the disclosed embodiments may be made without departing from the principles of the invention or the scope of the appended claims.

It is claimed:

1. A drive module for a conveyor having a plurality of load carrying rollers arranged in generally parallel, side-by-side relationship and mounted for rotation on transversely extending shafts supported by parallel side rails, said drive module comprising:

(a) power means for driving said module comprising at least two endless powered force transmitting members disposed below said load carrying rollers;
(b) a generally vertically extending supporting device mounted to one of said side rails;
(c) rotatable means supported by said supporting device for supporting two of said powered endless force transmitting members;
(d) a rotatable friction wheel operatively connected to said load carrying rollers so that when said friction wheel is rotated it will cause said load carrying rollers to rotate;
(e) a rotatable pressure roller movable between a first position out of engagement with said friction wheel and a second position in which said roller drivingly engages said friction wheel;
(f) power means for drivingly engaging said pressure roller and engageable with said force transmitting power means, including a first continuously driven rotating sprocket disposed on the pivotal axis of said support means, a second rotating sprocket disposed on the rotational axis of and concentrically connected to said pressure roller, and an additional endless chain drivingly interconnecting said two sprockets;
(g) support means on said supporting device for supporting said pressure roller for movement between said first and second positions, said second position being said driving position; and
(h) actuating means for moving said support means from said first position to said second position.

2. A drive module as claimed in claim 1, wherein said rotatable friction wheel rotates on the same axis of rotation as one of said load carrying rollers.

3. A drive module as claimed in claim 1, wherein said rotatable friction wheel rotates on the same axis of rotation as one of said load carrying rollers and causes said one load carrying roller to rotate.

4. A drive module as claimed in claim 1, wherein said support means on said supporting device for supporting said pressure roller also supports said power means.

* * * * *